(12) United States Patent
Takenaka et al.

(10) Patent No.: US 6,214,081 B1
(45) Date of Patent: Apr. 10, 2001

(54) HOT REPAIR MIX COMPRISING BISPHENOL AS A FLUIDIZING AGENT

(75) Inventors: Hiroshi Takenaka, Okayama; Shuzo Horita, Bizen; Toshihiko Akizuki, Bizen; Yoshiaki Osaki, Bizen, all of (JP)

(73) Assignee: Shinagawa Refractories Co., Ltd., Tokyo (JP)

( * ) Notice: Subject to any disclaimer, the term of this patent is extended or adjusted under 35 U.S.C. 154(b) by 0 days.

(21) Appl. No.: 09/630,740

(22) Filed: Aug. 2, 2000

Related U.S. Application Data

(62) Division of application No. 09/214,011, filed as application No. PCT/JP98/01899 on Apr. 24, 1998, now Pat. No. 6,120,593.

(30) Foreign Application Priority Data

May 7, 1997 (JP) .................................................. 9-116714
Jun. 13, 1997 (JP) .................................................. 9-156630

(51) Int. Cl.[7] .............................. F27D 1/16; C08L 95/00; C04D 35/66; C08K 5/13
(52) U.S. Cl. ........................... 75/325; 524/343; 106/284; 106/502; 264/30
(58) Field of Search .............................. 75/325; 524/343; 106/284, 502; 264/30

(56) References Cited

FOREIGN PATENT DOCUMENTS 8-169772 * 7/1996 (JP) ................................ C04B/35/66

* cited by examiner

Primary Examiner—David W. Wu
Assistant Examiner—Kelechi C. Egwim
(74) Attorney, Agent, or Firm—Armstrong, Westerman, Hattori, McLeland & Naughton LLP

(57) ABSTRACT

The hot repair mix according to the present invention comprises bisphenol as an auxiliary fluidizing agent in an amount of 1 to 20 weight parts and a material to form carbon bond in hot working process in an amount of 5 to 40 weight parts to 100 weight parts of a refractory material. It has satisfactory properties such as spreading property, hardenability, adhesive property, property of the finished portion in hot working process, and this leads to improvement of durability of the baking material. Moreover, there is no change over time such as solidification, sedimentation separation, etc. in summer season, and it can be easily transported and stored. Because of easy handling and good workability of this material, baking operation can be accomplished within short time, and it is very useful as a hot repair mix for repairing various types of refinery furnaces, molten metal containers, etc. in hot working process.

2 Claims, No Drawings

HOT REPAIR MIX COMPRISING BISPHENOL AS A FLUIDIZING AGENT

This application is a division of prior application Ser. No. 09/214,011 filed Dec. 17, 1998, now U.S. Pat. No. 6,120,593 which is a national stage application under §371 of international application PCT/JP98/01899 filed Apr. 4, 1998.

FIELD OF THE INVENTION

The present invention relates to a hot repair mix for repairing various types of refinery furnaces, molten metal containers, etc. in hot working process.

BACKGROUND ART

In the past, hot gunning material, hot baking material, etc. have been used as hot repair material for repairing damaged portion of furnace wall, furnace bottom, etc. in various types of refinery furnaces, containers, etc. such as converter, AOD (argon oxygen degassing) furnace, electric furnace, LF ladle, etc. To produce this type of hot baking material, refractory material such as dolomite, magnesia, etc. is kneaded with coal tar binder, and mass of this material having some consistency is supplied and brought into contact with the damaged portion in the furnace through furnace inlet after molten steel has been delivered in case of converter and the baking material is molten, spread and developed by heat inside the furnace and the damaged portion is repaired.

The properties required for this type of baking material are: no change over time, good spreading property in hot working process, good adhesive property, high durability, and short baking and hardening time. The baking material produced by the use of coal tar binder has no problem in such factors as the change over time, spreading property, and durability, while it is disadvantageous in that longer hardening time is required.

In this respect, to overcome the problem of long baking time of the conventional paste type baking material using coal tar binder, a slurry type baking material has been proposed to reduce the baking time. This material has viscous and fluidizing property and uses liquid novolak type phenol resin, and satisfactory effect has been attained (JP-B-5-41594 and JP-B-6-31161). Because solvent is contained in the phenol resin solution, there are less carbon components when it is carbonized. For this reason, it has such problems that it has lower strength when hardened and it is subject to changes over time due to sedimentation and separation of coarse particles during storage because it is a baking material having viscous and fluidizing property.

Also, a powder type baking material has been proposed (JP-A-4-170370) to reduce the baking time and to improve durability. This is produced as follows: A mixed powder type basic refractory material is coated with pitch and/or creosote oil, and to this powder material, aromatic petroleum resin containing heavy oil and $C_9$ fraction as main components is added as auxiliary combustion agent and wetting agent. By this material, it is possible to reduce the hardening time and it can also provide high strength by carbon bond when it is hardened. However, it has such problems that it is solidified during storage in summer season because of creosote oil or heavy oil, which are added as auxiliary combustion agent and wetting agent.

Further, another type of baking material has been proposed (Japanese Patent Publication No.2555850), which is produced by adding a material to form carbon bond in hot working process and also by adding lactam as auxiliary fluidizing agent. However, it has disadvantages in that lactam has high deliquescence and is changed to polyamide through ring-opening polymerization in the presence of water and alkali metal and it is also solidified during storage in summer season or under high temperature and high humidity conditions.

Still another baking material has been proposed (JP-A-8-169772), which is produced by adding diphenyl or diphenylamine as auxiliary fluidizing agent to a material to form carbon bond in hot working process. However, its adhesive strength is not high enough compared with the conventional products.

It is an object of the present invention to provide a hot repair mix, which is suitable for use to carbon bonded brick such as magnesia-carbon brick used in various types of refinery furnaces and which has sufficient adhesive property with base material and durability suitable as repair material. Further, it forms carbon bond in hot working process, shows neither sedimentation separation nor changes over time, has high spreading property in hot working process, is shorter in the baking time after the processing and has high durability.

DISCLOSURE OF THE INVENTION

A first hot repair mix according to the present invention comprises bisphenol as an auxiliary fluidizing agent in an amount of 1 to 20 weight parts and a material to form carbon bond in hot working process in an amount of 5 to 40 weight parts to 100 weight parts of a refractory material.

A second hot repair mix according to the present invention comprises p-alkylphenol as an auxiliary fluidizing agent in an amount of 1 to 20 weight parts and a material to form carbon bond in hot working process in an amount of 5 to 40 weight parts to 100 weight parts of a refractory material.

The present invention also provides a material as described above, wherein the material to form carbon bond in hot working process is a pitch having softening point of not higher than 300° C.

According to the present invention, bisphenol or p-alkylphenol is added as an auxiliary fluidizing agent to a hot repair mix, which comprises a refractory material and a material to form carbon bond in hot working process. It has good spreading property, hardenability, adhesive property and high physical property in processing result, and it contributes to improvement of durability of the baking material. Moreover, the material of the present invention is not subject to changes over time such as solidification, sedimentation separation, etc. Thus, it can be easily transported and stored. Further, it is easy to handle and apply, and baking repair can be accomplished within short time.

BEST MODE FOR CARRYING OUT THE INVENTION

As the refractory material to be used in the present invention, a material suitable for the base material at the portion to be repaired can be used. For example, basic oxides such as magnesia, dolomite, calcia, etc., neutral oxides such as alumina, chromia, etc., acidic oxides such as silica, zircon, zirconia, etc., non-oxides such as carbon, silicon carbide, silicon nitride, etc. may be used. These may be used alone or in combination. It is preferable that the particle size of the refractory material is similar to that of ordinary type castable refractory material, e.g. it contains fine powder with particle size of not more than 0.3 mm in an amount of 20 to 60 weight %.

As the material to form carbon bond in hot working process, tar, pitch, etc. may be generally used, and phenol resins may be simultaneously used. These may be added in an amount of 5 to 40 weight parts to 100 weight parts of the refractory material, or more preferably in an amount of 10 to 30 weight parts. If it is added in an amount of less than 5 weight parts, sufficient carbon bond cannot be formed, and the finished portion has lower strength and poor adhesive property. If it is added in an amount of more than 40 weight parts, the finished portion has high apparent porosity and is lower in resistance to slag.

The pitch to be used in the present invention may be coal type or petroleum type. Its softening point plays such a role that it is molten by furnace heat and is fluidized. In this respect, the softening point is limited to not higher than 300° C. Normally, it is preferably in the range of 100 to 230° C.

As the phenol resin, it is preferable to use thermoplastic novolak type resin. Preferably, it has melting point of not higher than 120° C. and is in the state of powder or flake at room temperature.

The bisphenol to be used as an auxiliary fluidizing agent in the present invention is a material which is expressed by the following general formula:

(where R and R' each represents hydrogen or alkyl group and may be the same or different). For example, bisphenol A may be used, which is obtained by condensation of acetone and phenol using sulfuric acid or concentrated hydrochloric acid as catalyst and which is expressed by the following formula:

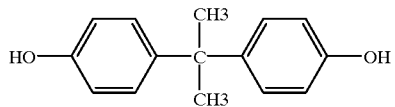

or bisphenol F may be used, which is synthesized from formalin and phenol and expressed by the following formula:

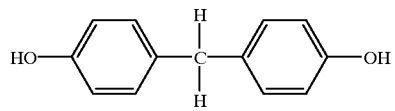

Above all, it is preferable to use bisphenol A, in which both R and R' represent methyl groups because it is inexpensive. Bisphenol A is in white needle shape or in flaky crystal, has melting point of 155° C. to 157° C., boiling point of 250° C. to 252° C. (13 mmHg), is insoluble in water, has high compatibility with pitch, is dissolved with pitch in hot working process and exhibits high fluidization promoting effect for the baking material, is evaporated and burnt at temperature of higher than 250° C. and shows an effect to promote carbonization of the pitch and also an effect to shorten the hardening time. Because of high compatibility with pitch, it improves wetting property between the pitch, now having lower viscosity, and refractory aggregate or furnace wall and also exhibits an effect to provide high adhesive strength.

The p-alkylphenol to be used as an auxiliary fluidizing agent in the present invention is expressed by the following general formula:

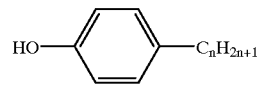

(where n represents an integer of 2 or more).

It has melting point between 44° C. to 100° C., or more preferably between 60° C. to 84° C. This p-alkylphenol can be industrially produced by reaction of ethylene series hydrocarbon and phenol in the presence of aluminum chloride, sulfuric acid, hydrofluoric acid, boron fluoride, etc. The substances as shown in Table 1 may be used.

TABLE 1

|  | Melting point (° C.) | Boiling point (° C.) |
| --- | --- | --- |
| p-ethylphenol | 44.8 | 219 |
| p-isopropylphenol | 61 | 223–225 |
| p-tert-butylphenol | 98.4 | 239.7 |
| p-tert-amylphenol | 95 | 265–267 |
| p-tert-octylphenol | 84 | 283 |

Among these p-alkylphenols, a substance such as p-ethylphenol having lower melting points (e.g. 44.8° C.) is permeated into refractory material in hot summer season and is solidified. Such substances may be combined with other p-alkyphenol having higher melting point so that the substance will be in the state of powder. The p-alkylphenols having melting point between 60° C. to 100° C. can be used alone in the baking material and has no problem during storage in summer season.

At room temperature, p-ethylphenol is in the state of white solid, p-isopropylphenol is in needle crystal, and p-tert-butylphenol, p-tert-amylphenol, p-tert-octylphenol are all in the state of white flake. All of the p-alkylphenols are insoluble in water, have high compatibility with pitch, are dissolved with pitch in hot working process and show an effect to promote fluidization of the baking material, are evaporated and burnt at temperature higher than the range of 230° C. to 290° C., shows an effect to promote carbonization of pitch and has an effect to reduce the hardening time. Because of high compatibility with pitch, it can improve wetting property of the pitch, now having lower viscosity, and refractory aggregates and furnace wall and provides high adhesive strength.

The quantity to be added of bisphenol or p-alkylphenol, which is used as an auxiliary fluidizing agent, is preferably 1 to 20 weight parts to 100 weight parts of the refractory aggregate, or more preferably 1 to 15 weight parts. If it is added in an amount of less than 1 weight part, spreading property of the baking material in hot working process will not be satisfactory. If it is added by more than 20 weight parts, the finished portion becomes porous and has lower corrosion resistant property, and this is not desirable.

In addition, for the purpose of preventing oxidation or improving strength of the finished portion, metal powder may also be simultaneously used.

In the present invention, if powder material is used as a binder, it may be used as a powder repair material. If liquid is used as a binder, it may be used as a paste type repair material. In any of these conditions, the material is easy to transport and store, and it is not subject to changes over time almost at all. When the hot repair mix of the present invention is used, it will suffice that it is simply supplied to the portion to be repaired in various types of refinery furnaces by adequate means and it is used for baking the portion to be repaired.

The refinery furnace to be repaired is kept at temperature of at least 600° C. or higher. Bisphenol or p-alkylphenol contained in the repair material of the present invention is molten due to heat of the furnace wall. The entire repair material is spread in fluidized state and moved into every nook and corner of the portion to be repaired. The refractory material is filled with the repair material, and carbon bond is formed by carbonization of the pitch, and the repair material is hardened. When bisphenol or p-alkylphenol is molten and begins to be fluidized, it is volatilized and decomposed, burned and dissipated. Accordingly, baking operation can be accomplished within short time.

In the present invention, a fluidization promoting agent having high compatibility is used. Compared with the baking material using only tar or pitch, it shows higher filling performance and higher adhesive property and exhibits high durability. Further, bisphenol or p-alkylphenol is turned to low molecular compounds due to volatilization and decomposition and is burnt by heat in the furnace. As a result, less smoke occurs and carbonization of binders such as tar, pitch, phenol resin, etc. having lower thermosetting property due to burning heat can be promoted.

In the following, description will be given on several examples of the present invention:

Examples 1 to 7 are concrete examples of repair materials, which contain bisphenol as an auxiliary fluidizing agent, and Examples 8 to 15 are concrete examples of repair materials, which contain p-alkylphenol.

Comparative example 1 is an example where thermoplastic liquid phenol resin is added to a refractory material. In Comparative example 2, coal pitch and ε-caprolactam as fluidizing agent are added. In Comparative example 3, coal pitch and diphenyl as an auxiliary fluidizing agent are added to a refractory material. In Comparative example 4, coal pitch is added to a refractory material. In Comparative example 5, coal pitch as well as creosote oil and heavy oil as auxiliary combustion agent and wetting agent are added to a refractory material.

To a castable plate in a furnace maintained at 1000° C., 800 g of a blended material as shown in Tables 2 to 4 is thrown in. After fire has been extinguished, the castable plate is taken out of the furnace, and on the portion where baking material was spread, average diameter was determined as spreading property.

On magnesia brick maintained at 1000° C., a ring-like metal frame of 53×40 mm (inner diameter×height) was placed. To this, 200 g of a specimen was thrown in, and the time until the entire portion was hardened was determined as hardening time.

After the specimen was hardened, adhesive strength was immediately determined using a shear adhesive strength measuring instrument. Also, into a space enclosed by magnesia bricks in a furnace maintained at 1000° C., 1 kg of a specimen was thrown in. After it was hardened, physical property of the hardened portion was determined.

Further, storage test was performed as follows: At the temperature of 50° C., 150 g of a specimen was filled in a metal frame of 50 mm×50 mm (inner diameter×height) at temperature of 50° C. A load of 0.025 MPa was applied. After maintaining this condition for one hour, it was taken out, and if it collapsed, it was regarded as satisfactory.

The results are summarized in Tables 2 to 4. The composition shown in the tables represents weight parts.

TABLE 2

| | Concrete examples | | | | | | |
|---|---|---|---|---|---|---|---|
| | 1 | 2 | 3 | 4 | 5 | 6 | 7 |
| Magnesia | 100 | 100 | 100 | 100 | 100 | 100 | 100 |
| Bisphenol A | 2 | 5 | 7 | 9 | 6 | 5 | 5 |
| Coal pitch (softening point 110° C.) | 25 | 16 | 14 | — | — | 13 | — |
| Coal pitch (softening point 150° C.) | — | — | — | 14 | 11 | — | — |
| Petroleum pitch (softening point 220° C.) | — | — | — | — | — | — | 16 |
| Thermoplastic powder phenol resin *1 | — | — | — | — | 3 | — | — |
| Spreading property (mm) | 257 | 245 | 248 | 250 | 235 | 223 | 230 |
| Adhesive strength (MPa) | 2.6 | 2.7 | 2.5 | 2.6 | 2.0 | 2.5 | 2.6 |
| Hardening time (min.) | 5 | 4 | 3.5 | 4 | 3.5 | 3.5 | 4 |
| Apparent porosity (%) | 26.2 | 25.5 | 24.7 | 24.5 | 25.4 | 25.3 | 25.6 |
| Bulk specific gravity | 2.40 | 2.42 | 2.45 | 2.46 | 2.41 | 2.43 | 2.42 |
| Storage test | Not solidified | | | | | | |

*1 Novolak resin having melting point of 85° C. (number average molecular weight: 815)

TABLE 3

| | Concrete examples | | | | | | | |
|---|---|---|---|---|---|---|---|---|
| | 8 | 9 | 10 | 11 | 12 | 13 | 14 | 15 |
| Magnesia | 100 | 100 | 100 | 100 | 100 | 100 | 100 | 100 |
| p-t-iso-propylphenol | 2 | — | — | — | — | — | — | — |
| p-t-butylphenol | — | 5 | 4 | — | — | 5 | 7 | — |
| p-t-amylphenol | — | — | 5 | — | — | — | — | — |
| p-t-octylphenol | — | — | — | 7 | 6 | — | — | 5 |
| Coal pitch (softening point 110° C.) | 25 | 16 | — | 14 | — | 13 | 14 | — |
| Coal pitch (softening point 150° C.) | — | — | 14 | — | 11 | — | — | — |
| Petroleum pitch (softening point 220° C.) | — | — | — | — | — | — | — | 16 |
| Thermoplastic powder phenol resin *1 | — | — | — | — | 3 | — | — | — |
| Spreading property (mm) | 258 | 247 | 246 | 253 | 240 | 230 | 251 | 232 |
| Adhesive strength (MPa) | 2.6 | 2.7 | 2.6 | 2.7 | 2.1 | 2.4 | 2.7 | 2.7 |
| Hardening time (min.) | 5 | 4 | 4 | 3.5 | 3.5 | 3.5 | 3.5 | 4 |
| Apparent porosity (%) | 26.5 | 25.4 | 24.6 | 24.2 | 25.3 | 25.3 | 24.3 | 25.7 |
| Bulk specific gravity | 2.41 | 2.42 | 2.45 | 2.46 | 2.42 | 2.44 | 2.46 | 2.43 |
| Storage test | Not solidified | | | | | | | |

*1 Novolak resin having melting point of 85° C. (number average molecular weight: 815)

TABLE 4

|  | Comparative examples | | | | |
| --- | --- | --- | --- | --- | --- |
|  | 1 | 2 | 3 | 4 | 5 |
| Magnesia | 100 | 100 | 100 | 100 | 100 |
| Pitch (softening point 110° C.) | — | 15 | — | 25 | — |
| Pitch (softening point 150° C.) | — | — | 23 | — | 20 |
| Liquid novolak type phenol resin *2 | 18 | — | — | — | — |
| Creosote oil | — | — | — | — | 2.5 |
| Heavy oil | — | — | — | — | 2.5 |
| ε-caprolactam | — | 7 | — | — | — |
| Diphenyl | — | — | 6 | — | — |
| Spreading property (mm) | 220 | 215 | 233 | 220 | 235 |
| Adhesive strength (MPa) | 0.6 | 1.3 | 0.8 | 1.8 | 1.4 |
| Hardening time (min.) | 3 | 7 | 6 | 15 | 10 |
| Apparent porosity (%) | 29.7 | 24.4 | 24.1 | 29.7 | 29.0 |
| Bulk specific gravity | 2.18 | 2.46 | 2.46 | 2.18 | 2.20 |
| Storage test | Separated | Solidified | Not solidified | Not solidified | Solidified |

*2 50% triethylene glycol solution of novolak resin (number average molecular weight 265); viscosity 55 p (25° C.) (manufactured by Sumitomo Durez Co., Ltd.)

Compared with the repair material given in Comparative examples, the hot repair mix of the present invention has good fluidizing property as expressed by the spreading property and good baking time as expressed by the hardening time. Further, it is considered that corrosion resistant property and durability are extensively improved because porosity of the finished portion is low and adhesive strength is high.

In the storage test showing the changes over time, no solidification was observed on the baking material according to the present invention. On the other hand, solidification was seen in the hot repair mixes of Comparative examples 2 and 5, and it is anticipated that these materials would be subject to the changes over time in summer season. The hot repair mixes of Comparative examples 3 and 4 have problems in adhesive strength and hardening time. Further, in Comparative example 1 using only liquid phenol resin, sedimentation separation of coarse particles was observed, and there were changes over time.

INDUSTRIAL APPLICABILITY

The hot repair mix according to the present invention is satisfactory in the properties such as spreading property, hardenability, adhesive property, and properties of the finished portion in hot working process, and this leads to the improvement of durability of the baking material. Because there is no change over time in summer season such as solidification, sedimentation separation, etc., it is easy to transport and store. Because of easy handling and good workability of this material, baking operation can be carried out within short time. Thus, it is very useful as the hot repair mix for repairing various types of refinery furnaces, molten metal containers, etc. in hot working process.

What we claim is:

1. A hot repair mix, comprising bisphenol as an auxiliary fluidizing agent in an amount of 1 to 20 weight parts and a material to form carbon bond in hot working process in an amount of 5 to 40 weight parts to 100 weight parts of a refractory material.

2. A hot repair mix according to claim 1, wherein the material to form carbon bond in hot working process is a pitch having softening point of not higher than 300° C.

* * * * *